April 9, 1963
B. WALKER
3,084,756
VEHICLE LIFTING AND TRAVERSING DEVICE
Filed Dec. 12, 1958
4 Sheets-Sheet 1
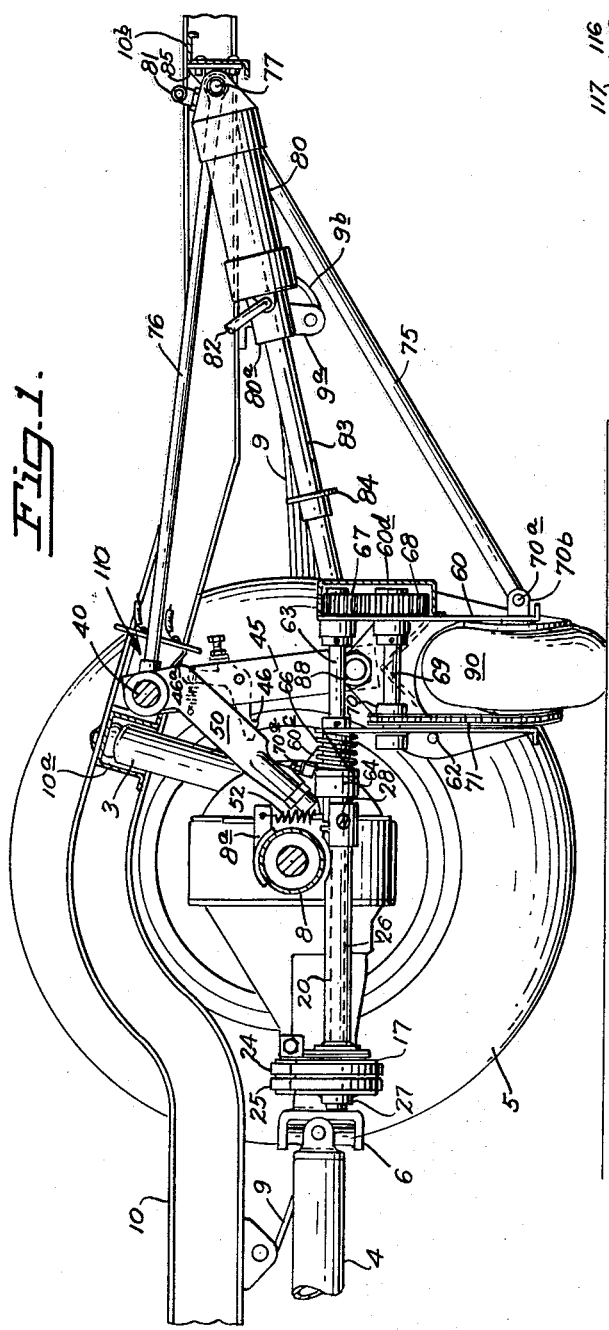
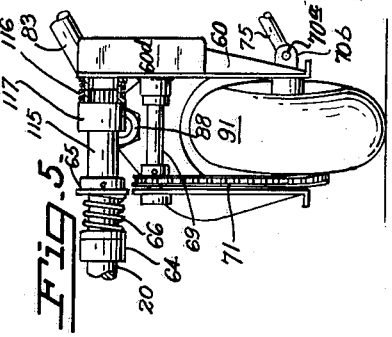
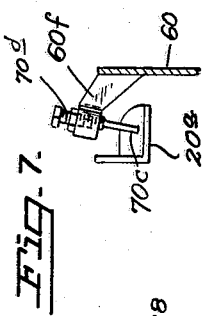
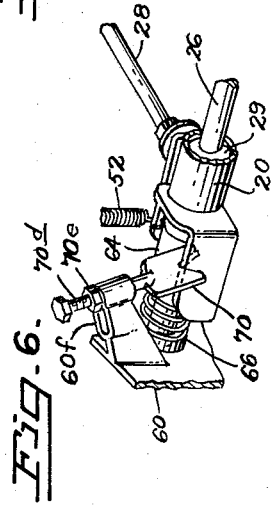
INVENTOR.
Brooks Walker April 9, 1963   B. WALKER   3,084,756
VEHICLE LIFTING AND TRAVERSING DEVICE
Filed Dec. 12, 1958   4 Sheets-Sheet 2
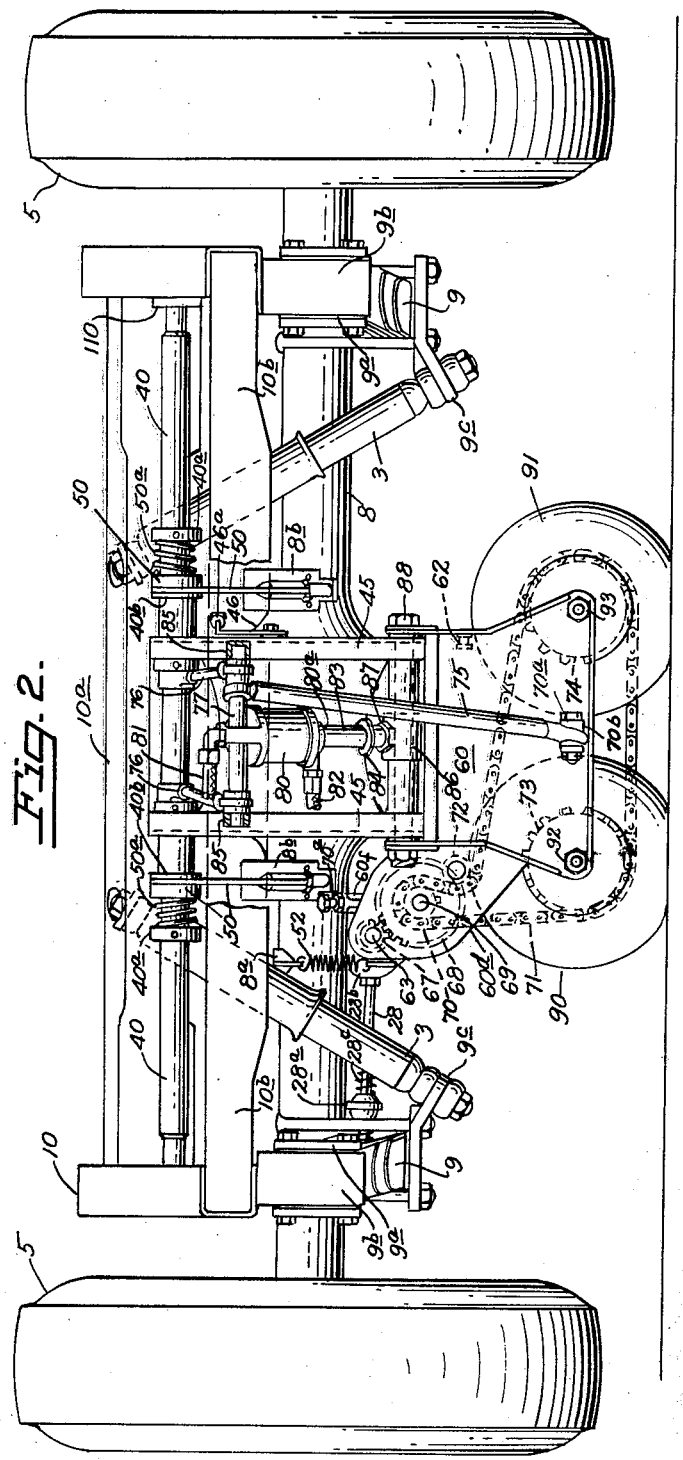
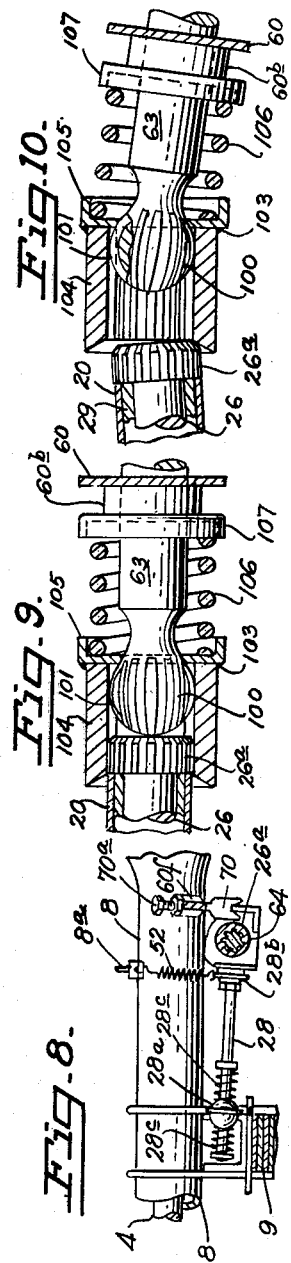
INVENTOR.
Booth Walker

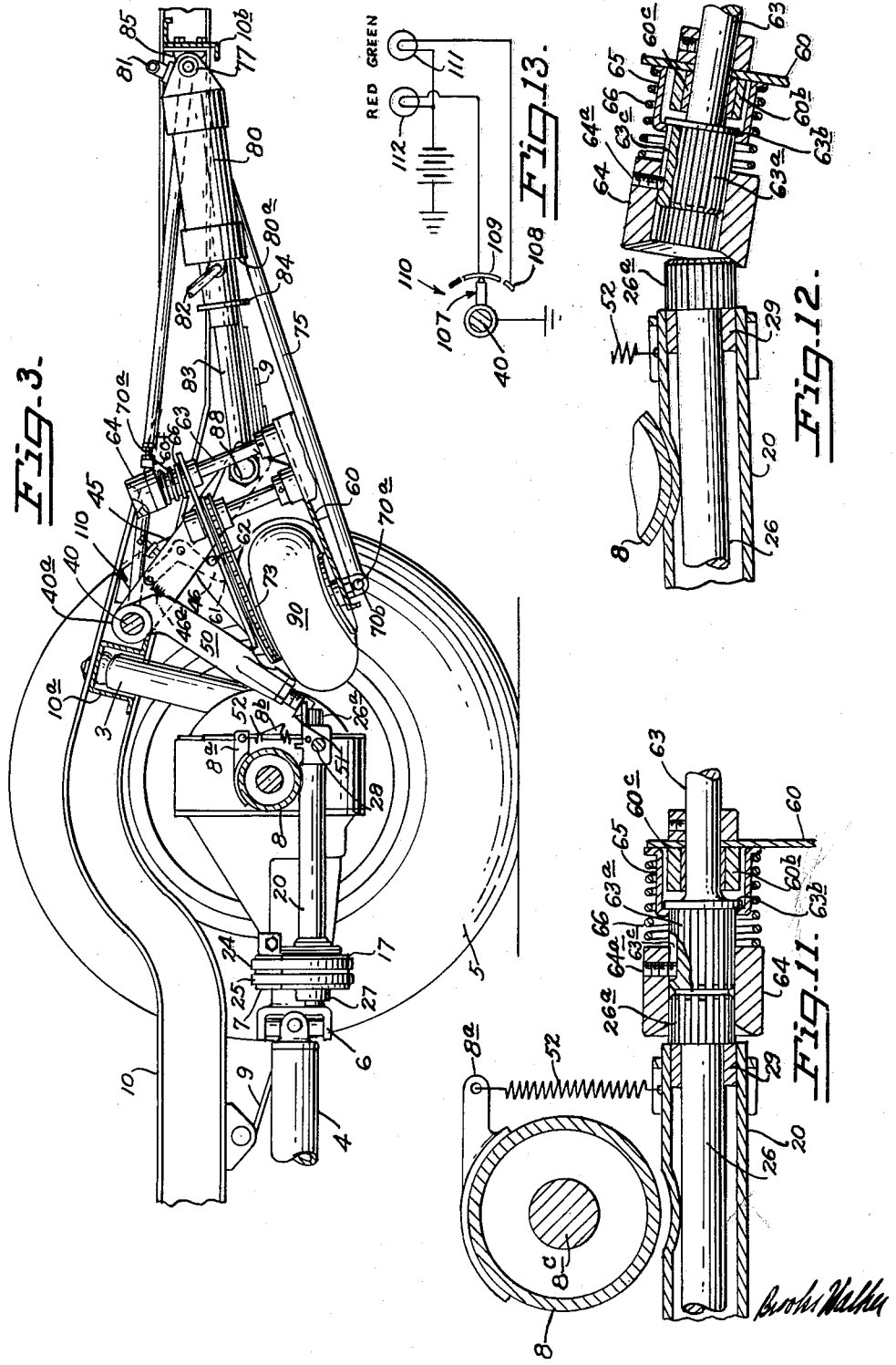

United States Patent Office 3,084,756
Patented Apr. 9, 1963

3,084,756
VEHICLE LIFTING AND TRAVERSING DEVICE
Brooks Walker, 155 Montgomery St.,
San Francisco, Calif.
Filed Dec. 12, 1958, Ser. No. 780,122
4 Claims. (Cl. 180—1)

This invention pertains to improvements in vehicle lifting and traversing devices and particularly to a device that is cheaper, lighter, easier to operate, and safer than those proposed previously.

This invention proposes the use of two small pneumatic or solid cushion tires that raises the car or retracts and folds rearwardly in back of the rear axle so as not to interfere with the conventional drive shaft or ground clearance when in the inactive position. These auxiliary wheels can be mounted on a single toggle that is actuated by a single rear cylinder, which is mounted on a bracket that carries radius rods extending to the top and bottom of the toggles so that the lifting stresses are in this assembly rather than transmitted through the vehicle frame and cross members as is the case in most such devices. The supporting rod for the top of the toggle is preferably flexible relative to the mounting in the vehicle frame and carries rear axle lifting means so that when the rear of the vehicle is on the auxiliary wheels it is supported to a large measure through the rear springs and a limited rear spring motion is provided through such rear springs and the flexing of the supporting rod for the auxiliary wheels.

Another object is to provide a power take off from the vehicle drive shaft to one or both of the auxiliary wheels so that the low and reverse gear positions and brake will control the traversing of the rear of the vehicle to the right, to the left, and control the braking of the traversing motion. The braking is effective as braking the rear wheels, in effect, brakes the drive shaft and the traversing device through the drive mechanism.

Another form of drive is where the auxiliary wheel support carries a reduction drive that meshes with said power take off that moves with the rear axle when the toggle is in the vehicle lifting position.

An object of the invention is to increase the speed of raising and lowering of the auxiliary wheels and minimize the lifting height of the rear of the vehicle.

Another object is to use a single toggle to support two wheels and provide car stability superior to the use of a single wheel.

Another object is to use a single toggle and folded wheels just rear of the rear axle to form the auxiliary support.

Another object is to provide a structure that can be applied to conventional motor vehicles with minimum unsprung weight, minimum or reduced changes necessary, no change in ground clearance, and minimum interference with the luggage compartment floor or foot board floor, as used with the rear facing seats in station wagons, and the like.

Another object is to provide an auxiliary support that is sprung when inactive, and supports the vehicle largely through the rear wheel suspension system when active and is compact in the space required for storage.

Another object is to have the auxiliary wheels closely in line with the rear wheels and still be unsprung when inactive.

Another object is to provide a compact parking device in back of the rear axle where more space is available, particularly if the spare tire is placed in one rear fender and the gas tank in the other, as is common in some cars manufactured today, thereby keeping the parking device away from the space forward of the rear axle which is very limited on bodies having low floor boards and multiple mufflers.

Another object is to provide radius rods between the operating hydraulic cylinder and the toggle to keep the large lifting forces from the frame cross members.

Another object is to provide a simple signal system for indicating when the device is moving up or down and also when the device is fully raised by the use of a compact simple switch.

Other objects will be more particularly pointed out in the accompanying specification and claims.

I have illustrated my invention by way of example in the accompanying drawings, in which:

FIG. 1 is a side view partly cut away of the rear portion of a vehicle showing one form of the invention.

FIG. 2 is a rear elevation view of the invention shown in FIG. 1, partly cut away.

FIG. 3 is a view similar to FIG. 1 with the lifting device in the retracted position.

FIG. 5 is a side view of an alternate drive for the wheels 91, the lower toggle of the mechanism shown in FIGS. 1 through 4.

FIG. 6 is an enlarged perspective view of a portion of the drive engaging mechanism shown in FIGS. 1 through 4.

FIG. 7 is an enlarged side view of a portion of the locator mechanism shown in FIG. 6.

FIG. 8 is a rear view of the auxiliary drive shaft support mechanism taken at section line 8—8 of FIG. 4.

FIG. 9 is an enlarged side view partly in section of an alternate drive to that shown in FIGS. 1, 11 and 12.

FIG. 10 shows the drive of FIG. 9 about to be disengaged.

FIG. 11 is an enlarged view partly in section of the detachable drive connection shown in FIGS. 1 and 4 shown engaged.

FIG. 12 is an enlarged view similar to FIG. 9 with the drive partly disengaged as the toggle folds towards its inactive position.

FIG. 13 is a view of a circuit arrangement for the control of indicating lamps associated with the device of the invention.

In all views like numerals refer to corresponding parts.

Figure 4:
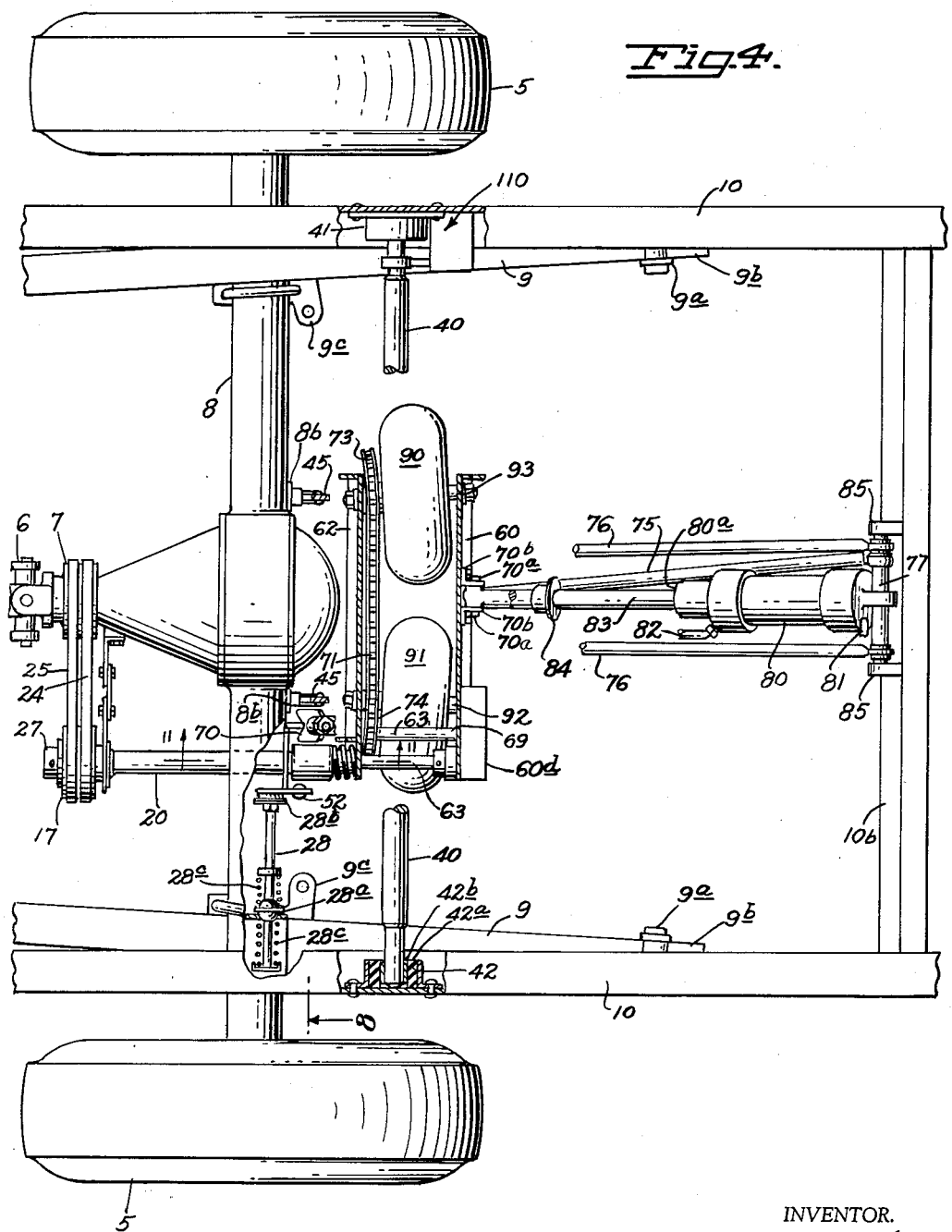
FIG. 4 is a plan view partly cut away of the mechanisms shown in FIGS. 1 and 2.

In FIGS. 1 through 4, 7, 8, 11, and 12, I have shown a vehicle frame 10 supported on rear wheels 5 through rear springs 9, rear shackles 9a and rear spring supports 9b. The axle 8 is connected to the wheels 5 and to the drive means of the differential (not shown). The vehicle engine operates through the drive shaft 4 and universal joint 6 to drive the shaft of the differential. A double V-belt pulley 7 is mounted on the shaft differential to be driven therewith. Another double V-belt pulley 17 is mounted near the end of jack shaft 26 which is suitably secured by nut 27 for rotation in housing 20 by bearings 29 as shown in FIGS. 11 and 12. The housing 20 is held against the rear axle 8 by a spring 52, the upper end of which is supported on a bracket 8a which is suitably attached to the axle 8.

A toggle is composed of an upper element 45 and a lower leg 60. The upper element 45 is supported on a shaft 40 journaled in flexible mountnig brackets 41 and 42 secured to the frame 10. The mounting brackets could be brass sleeves 42b inside compressible rubber-like supports 42a to allow limited vertical and non-aligned motion between the shaft 40 and the frame 10. The shaft 40 is resilient and can be vertically bowed between its ends so that hooks 50 may engage axle pads 8b as the upper toggle and shaft 40 move from retracted position shown in FIG. 3. This movement occurs through the action of springs 50a attached to adjustable collars 40a and driving hooks 50 by the ends of spring 50a being inserted in holes in collars 40a and hooks 50 at each end of springs 50a. The collars 40b bear against the hooks 50 to aid in the engaging and disengaging motion of hooks 50 as the upper toggle element 45 starts to rotate clockwise from its retracted position as viewed in FIG. 3. This permits the hook ends 51 to engage or bear against the axle pads or lift plates 8b to be in position to lift the axle 8 whenever the wheels 90 and 91 of the lower arm 60 of the toggle start to lift the vehicle frame 10.

Shock absorbers 3 are connected between spring plates 9c at their lower ends and frame cross member 10a at their upper ends. A lift cylinder 80 is actuated by fluid entering through pipe 81 at its rear end or entering through pipe 82 at the cylinder front end as viewed in FIG. 3. The control of the lifting or retracting fluid is from an engine driven pump by suitable valves such as are shown in my U.S. Patent No. 1,884,932, entitled "Vehicle Lifting and Traversing Device" or my pending patent application, Serial No. 700,216, entitled "Vehicle Lifting and Traversing Device," or by any other suitable means, the control for which is not shown herein.

The cylinder 80 is pivoted at its rear end by a bolt 77 mounted on brackets 85 which are secured to a frame cross member 10b. Radius rods 76 are secured at one ends to a bolt 77 and at the other end to the shaft 40 in space between the ends of the upper toggle 45 which are welded or otherwise secured to the shaft 40. A radius rod 75 is mounted on the bolt 77 and is attached to a lower toggle element 60 by a bracket 70b and bolt 70a. A piston rod 83 is actuated by the cylinder 80 and is attached to a toggle pivot bolt 88 by a rod end 86 and a length adjusting nut 87. A collar 84 limits the rearward motion of the piston rod 83 when it butts against cylinder head 80a. Auxiliary wheels 90 and 91 are mounted for rotation on the lower toggle element 60 on axles 92 and 93 supported thereby. The wheel 90 has a sprocket 73 attached thereto in driving relation. The wheel 91 has sprocket 74 attached thereto also in driving relation.

When piston rod 83 moves forward from the position shown in FIG. 3, the retaining hook 46 will be disengaged from the roller 62 mounted on a bracket 61 on the lower toggle element 60 against which it was retained by a spring 46a. The bolt 88 will continue to move forwardly and the shaft 40 will rotate clockwise as viewed in FIG. 3 to cause the hooks 50 to engage the axle plates 8b and lift the axle 8 when the wheels 90 and 91 lift the vehicle as the toggle elements 45 and 60 straighten out to the position shown in FIGS. 1, 2, and 4. The hooks 50 will bear against the axle plates 8b while springs 50a will unwind during the operation.

The jack shaft 26 is driven by the pulley 7, belts 24 and 25, pulley 17 from drive shaft 4 and universal joint 6. The double pulley 17 is attached to shaft 26 by a nut 27. The rear end of the shaft 26 has a spline 26a which is engaged by internally splined collar 64 mounted on spline end 63a of a shaft 63. (See FIGS. 11 and 12.) The shaft 63 is journaled in a bearing 60c in housing 60b of the lower toggle element 60. A collar 65 rotates with the spline end 63a as it engages the flange 63b. A spring 66 urges a spline collar 64 away from the collar 65 to where pin 64a butts the end of a groove 63c in the spline end 63a. This action forms a drive between the spline 26a and the spline 63a in the vehicle fully lifted position of toggle elements 60 and 45. When the toggle elements 45 and 60 are retracted slightly by the piston rod 83, the drive will be disengaged as shown in FIG. 12. The shaft 63 drives a gear 67 which meshes with a gear 68 inside of a gear box 60d. The gear 68 drives a shaft 69 which carries a sprocket 70. The sprocket 70 drives a chain 71 which drives the sprocket 73 on the wheel 90 and the sprocket 74 on the wheel 91. The tension on the chain being adjusted by an idler 72. The wheels 90 and 91 are preferably not in line but their axles are directed to a point near the center of the front wheels so they will roll in a true arc when traversing the vehicle about a center between the front wheels to reduce the forward or backward creeping which would otherwise occur. Some flexibility of the location of the rear portion of the shaft housing 20 may be desirable during driving engagement or disengagement of the spline 26a. This flexibility is provided by the spring 52 and the radius rod 28 which is ball mounted at each end at 28a and 28b with the end 28a spring retained by springs 28c. An alternate detachable drive is shown in FIGS. 9 and 10 wherein the spline end 26a of jack shaft 26 is engaged by an internally splined collar 104 mounted on a ball spline 100 with a spline 101 cut therein disposed in mesh with the internal spline of the collar 104. A collar 105 is welded at 103 to the collar 104 and prevents a spring 106 from forcing the collar 104 off the ball 100 because the inner diameter of collar 105 is smaller than the outside diameter of the ball 100. A spring 106 tends to hold the collar 104 in line with the shaft 63 but allows a limited universal action during driving engaging or disengaging with spline end 26a. The spring 106 bears against a collar 102 mounted on the shaft 63 against the housing 60b on the toggle element 60. With the vehicle rear wheels raised as shown in FIGS. 1 and 2 and the rear wheel drive placed in low gear, the car will traverse slowly to the right as viewed in FIG. 2 and to the left when the rear wheel drive is in reverse with the rear wheels rotating. When the driver wishes to stop, the foot or hand brake will stop the rear wheels, and through the stopping of the drive mechanism, the wheels 90 and 91 will be stopped. The slight angle of wheels 90 and 91 and sprockets 73 and 74 is within the limits of allowable misalignment for chain drives at limited speed and duration of operation.

In FIGS. 5 and 13 I have shown a switch 110 in which an arm 107 on the shaft 40 will contact segment 108 due to the rotation of the shaft as the vehicle is moved to fully lifted position. The engagement of the contact segment 108 completes a circuit to a green light 111 to indicate the raised position of the vehicle. When retracting the toggle elements 45 and 60, the switch arm 107 moves across a contact segment 109 to light another indicator light 112, preferably red, to show that the device is in the process of raising or lowering. When fully raised, the arm 107 will move from the contact 109 so both lights will go off, indicating that the device is fully retracted and locked by the hook 46 engaging the roller 62 by the action of spring 46a. With this arrangement, an arm 107 of a simple switch 110 operates two indicator lights in a desired manner.

In FIGS. 6 and 7 I have shown a device for assisting in the lining up of shaft 20 and spline 26a with internal spline collar 64 and spline 63a of shaft 63 when shaft 63 swings down from its retracted position shown in FIG. 3 to the vehicle lifted position shown in FIG. 1. Spring 52 will hold the rear of housing 20 raised against axle 8 in a non-rattling relationship when toggle arm 60 is folded up as shown in FIG. 12 before the driving connection with spline collar 64 is made. As the spline collar 64 swings down into meshing relationship, a fork end 70c on adjustable bolt 70d supported on a bracket 60f and secured thereto by a jamb nut 70e will assist in locating spline end 26a in line with internal spline collar 64 for meshing relationship. This will force the rear portion of housing 20 and spline end 26a downwardly slightly below axle 8 as internal spline collar 64 swings forward and downward from the position shown in FIG. 12 with the final rotation into lifting position of a toggle element 60 as shown in FIGS. 1, 2, 6, 7, and 11. The V-slot in fork end 70c helps move spline end 26a right or left to line up with internal spline collar 64 to take care of any slight horizontal change due to lifting the car on a slight incline facing right or left which may spring shaft 40 slightly to require a slight right or left up or down motion of spline end 26a during engagement, disengagement, or during acceleration or braking during the traversing operation. Such motion will be minimized by the hooks 50 engaging the axle pads 8b prior to the lifting operation. The rod 28 is spring mounted at ball joint 28a by springs 28c as shown in FIG. 8 to allow limited right and left motion of spline end 26a.

In FIG. 5 I have shown a slightly different arrangement of the drive engaging shaft similar to shaft 63, wherein a spring 116 presses against a collar 117 on the outside of a universal joint nested underneath to hold shaft 115 in alignment with the axis of gear 67 as shown in FIG. 2 in gear box 60d. The outer end of shaft 115 has collar 65, spring 66, and internal spline collar 64 which are all similar to the construction shown in FIGS. 1, 3, 4, 11, and 12. However, the universal joint inside collar 117 allows more adjustment or motion to the spline collar 64 which may be desirable in making engagement with spline 26a during the rotation of toggle arm 60 into vehicle lifting and traversing position or during the flexing of shaft 40 during traversing or lifting operations. Spring 116 is preferably strong enough to hold shaft 115 in alignment without rattling when in the inactive position.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In a lifting and traversing device for a vehicle, an auxiliary wheel, a toggle mechanism embodying a pair of pivoted members, means pivotally supporting the one end of one of the members of the toggle mechanism on the vehicle, means pivotally supporting the auxiliary wheel on the toggle mechanism, a ram extensible and retractable longitudinally of the vehicle, pivot means for securing one end of the ram to the vehicle and the other end to the pivot joining the members of the toggle mechanism, a pair of rods having one end connected to the pivot means supporting the ram on the vehicle with the end of one rod secured to the pivot supporting the toggle mechanism, and pivot means securing the free end of the other rod to the free end of the other member of the toggle mechanism.

2. In a lifting and traversing device for a vehicle, an auxiliary wheel having a support, a toggle mechanism embodying a link and said support when secured by a pivot, means pivotally supporting the free end of the link of the toggle mechanism from the vehicle, a ram extensible and retractable longitudinally of the vehicle, pivot means securing one end of the ram to the vehicle and the other end being joined to the pivot of the toggle mechanism, a rod connected to the pivot means which joins the ram to the vehicle and to the pivot means supporting the free end of the link of the toggle mechanism to the vehicle, and means for driving said auxiliary wheel.

3. The combination in a lifting and traversing device, of a pair of fixed pivots, a toggle mechanism having a first and second leg, pivot means interconnecting said legs, one end of one leg being secured by one of said fixed pivots, a ground-engaging wheel mounted for rotation on the free end of the other leg of said toggle mechanism, a ram having one end secured by the other of the fixed pivots of the pair, means securing the other end of the ram to the pivot interconnecting the legs of the toggle mechanism, and rigid means pivotally secured to the free end of the other leg of the toggle mechanism and to the fixed pivot which supports the ram.

4. In a lifting and traversing device for a vehicle, a ground-engaging member, a toggle mechanism comprising two legs which are pivoted together, one said leg being pivoted to the vehicle, the other said leg being pivoted to the member, a ram having one end pivoted to the vehicle, the opposite end pivoted to the pivot joining the legs of the toggle mechanism, rigid means separate from the vehicle interconnecting the pivot attaching said leg to the vehicle with the pivot which secures the ram to the vehicle, said ground-engaging member being a wheel, and driving means for said wheel carried by said toggle mechanism including a driving shaft and connecting means between said shaft and the driving means for the vehicle which is moved into driving relationship when the wheel supports said vehicle.

References Cited in the file of this patent

UNITED STATES PATENTS

| | | |
|---|---|---|
| 1,580,318 | Nordenskjold | Apr. 13, 1926 |
| 1,693,288 | Walker | Nov. 27, 1928 |
| 1,884,932 | Walker | Oct. 25, 1932 |
| 1,890,716 | Andreasen et al. | Dec. 13, 1932 |
| 1,967,588 | Nickerson | July 24, 1934 |
| 2,555,925 | Genthe | June 5, 1951 |
| 2,621,021 | Dahl et al. | Dec. 9, 1952 |